3,250,623
NEOMYCIN-CONTAINING FEED COMPOSITIONS
Giles St. Clair, Montclair, N.J., assignor to S. B. Penick and Company, New York, N.Y., a corporation of Delaware
No Drawing. Filed Apr. 4, 1963, Ser. No. 270,563
4 Claims. (Cl. 99—2)

This application is a continuation-in-part of application Serial No. 166,470 filed January 12, 1962, and now U.S. Patent 3,085,036 issued on April 14, 1963.

This invention relates to nutritive compositions. More specifically, it relates to compositions containing an antibiotic in special form, namely the resin adsorbate of neomycin for the purpose of growth stimulation in healthy animals including mammals and poultry.

The parent application was based on the discovery that the carboxylic resin adsorbate of neomycin was particularly effective in the treatment of the gastroenteritis-diarrheal syndrome of young animals. In the course of administration of this resin adsorbate of neomycin to animals for the treatment and cure of experimental infections, it was noted that in cases where the experimental infection "did not take," the test animals under medication did better from the point of view of weight gain and overall efficiency of feed utilization.

It is therefore an object of this invention to provide animal rations containing growth-promoting quantities of the carboxylic resin absorbate of neomycin.

It is a further object of this invention to provide concentrates containing the resin carboxylic resin adsorbate of neomycin for the preparation of such animal feeds.

The invention sought to be patented resides in the concept of promoting the growth of commercial domestic mammals and poultry by the administration of carboxylic acid resin complexes of neomycin admixed with the normal edible ration of the animals of the concept of fortified rations themselves.

Neomycin, in the form of the base or its mineral-acid salts, has previously been tried for growth promotion qualities in animal feeds with but variable and/or marginal results as reported in "Antibiotics: Their Chemistry and Non-Medical Uses" (H. S. Goldberg, ed.) Van Nostrand, 1959. (Chapter on Antibiotics and Nutrition and appended bibliography.)

I have found by contrast that neomycin in the form of the carboxylic acid resin-adsorbate gives improved weight gain and feed utilization in livestock and poultry. The resin is administered in concentrations of above 2 grams of the neomycin resin adsorbate (about 0.8–1.4 grams of neomycin activity as the base) per ton of feed.

Weight gains ranging from 3% to 12% improvement over controls and improved feed utilization ranging from 3 to 9% over the controls have been obtained by administration of the feed rations of this invention.

The neomycin resin-adsorbate of this invention is described in connection with therapeutic formulations in the aforementioned US Patent 3,085,936 of which this application is a continuation-in-part. It is formed by the base-exchange reaction between a neomycin solution and a carboxylic acid resin. The neomycin solution can be obtained from solutions of salts or the base of neomycin or as a result of the growth of a neomycin-producing strain of *Streptomyces fradiae* in an aqueous nutrient medium. As described in the Waksman neomycin Patent U.S. 2,789,620, the inoculation medium is permitted to ferment until a maximum production of neomycin is obtained. The fermented beer is then cleared of solids, mycelia, insoluble salts, etc. and the clarified beer is neutralized and treated with carboxylic acid type resin in the alkali phase. The resin is converted to the alkali phase by treatment with either potash or caustic soda. The beer is kept in contact with the resin for periods sufficient to permit substantially complete adsorption of the neomycin activity onto the resin. The resin is then washed, dried and milled. This product is the active ingredient of this invention.

The adsorption preferable is carried out on the clarified beer i.e. one from which the mycelia and insoluble salts resulting from the growth of the streptomyces organism have been removed, but the adsorption can also be carried out on the unclarified beer. In such cases the mycelia can be subsequently removed or the product can be directly dried with the mycelia acting as a nutritive diluent.

The neomycin can also be adsorbed from solutions of the neomycin salts such as the sulfate or hydrochloride or from solvent solutions of neomycin base itself.

The neomycin adsorbate of this invention is apparently nontoxic in either heroic doses or in extended feeding. Attempts to determine a toxic oral dose in mice proved impossible since at a dose of one thousand milligrams per kilogram the material was tolerated by the test animals without ill effect. Higher dosages were beyond the oral capacity of the animals.

Long-term feeding of the material was carried out with pigs and dogs. The long-term feeding of the pigs lasted for forty-nine days. The pigs showed no toxic manifestations as compared to controls that did not get the therapeutic supplement. Had there been any toxicity it would have been reflected in the growth and feed conversion values.

The chronic toxicity was also tested in dogs by adding the therapeutant to the food ration for twenty days. No change in blood chemistry was noted in the animal and no gross lesions were seen on autopsy.

The rations themselves are the normal components containing the usual nutriment for the particular species of animals being fed. Many such normal feed rations are described in the Annual Feed Trade Manual published by the National Provisioner Incorporated. These rations include the usual balance of carbohydrates, fats and proteins and where necessary, roughage. The rations may be additionally fortified with vitamins, other antibiotics and enzymes. Such additional components are well-known to the art and are the subject of many well documented scientific papers.

The invention will be described in the appended examples showing the weight-gains and improved feed-efficiencies resulting from feeding livestock with the neomycin adsorbate-containing feed compositions of this invention.

While the feed compositions set forth in the examples are particularly those for livestock and poultry, they can be modified for the feeding of domestic animals. The resin-adsorbate of neomycin can be added to prepared cat and dog feeds to similarly improve the weight-gain and well-being of these animals.

While the invention has been illustrated by specific examples of animal feeds and are fed to specific species of animals, it will be apparent that various equivalent changes and modifications may be resorted to in carrying out this invention without departing from the scope and spirit thereof. It will be understood that such equivalent embodiments are all within the purview of the annexed claims.

EXAMPLE 1

*Chickens.*—Two flocks of approximately 6,000 chickens each, at four and a half weeks of age were vaccinated for Newcastle disease and laryngotracheitis. This necessitated penning and catching the birds, putting the entire flock under a severe stress. Reaction to vaccination, together with this stress of catching, generally results in a respiratory condition which leads to chronic respiratory disease. Each group was put on a booster feed for three days. The first group was fed a chlortetracycline feed and the second group was given the same containing 100 grams of the neomycin adsorbate per ton of feed. The final weights, food conversions, and total mortality for the two flocks are shown in Table I.

*Table I*

CHICKENS

|  | Control | Treated |
|---|---|---|
| Number of birds | 6,300 | 5,700 |
| Final weight (pounds) | 3.78 | 3.74 |
| Feed Conversion efficiency, i.e., Pounds feed consumed ÷ Pounds weight gained | 2.43 | 2.31 |
| Mortality (number) | 36 | 18 |

These test results indicate that the chickens fed the neomycin carboxylic acid resin-adsorbate of this invention showed a better reaction to stress and a lower incidence of mortality. The improved feed conversion ratio is an indication of reduction of this stress reaction. (Example 6 U.S. Patent 3,085,036.)

EXAMPLE 2

Seventy-five pigs from 11 litters were weighed and divided by weight and litter into five lots of 15 pigs each. All the pigs were between two and three weeks of age and the lots were balanced according to weight with an average weight of about 12 lbs. One control lot was fed a basal ration containing no antibiotic. Two lots were fed the neomycin resin-adsorbate of this invention at a level of 200 grams of neomycin activity per ton and two lots were fed the resin adsorbate at a level of 100 grams of neomycin activity per ton. When fed at the 200 gram neomycin activity level for twenty-five days the average gains in the two lots were 60% greater than the negative controls. The average feed required per pound of gain in the lots at this level was 11.2% less than in the negative controls. At the 100 gram per ton level, gains in the two lots of 15 pigs was increased 53% over the negative controls and the feed required per pound of gain in the medicated lots was 11.8% less than the control lot. No deaths occurred in the pigs fed at the higher level. One death occurred at the 100 gram level. Two pigs died in the control lot.

EXAMPLE 3

Sixty weaned pigs were grouped by weight into 6 lots of 10 pigs each. All the pigs were between 19 and 25 days of age except for one litter which averaged 38 days of age. All the pigs received an iron injection within one week after birth and the male pigs were castrated at 10 days of age. All lots were confined in a clean barn on concrete in 10 x 16 pens provided with automatic water and self-feeders. Two lots were maintained as controls on an unmedicated "creep" ration, two lots received 100 grams of neomycin activity in the form of the resin adsorbate of neomycin of this invention dispersed in the control "creep" ration. Two lots received 200 grams of neomycin activity as the resin adsorbate of neomycin dispersed in the "creep" ration. At the 100 gram level and the 200 gram level of neomycin activity, the average daily weight gain was 20.3% and 25.9% greater than the controls and the feed conversion was improved by 10.8 and 5.1% respectively over the controls.

EXAMPLE 4

Sixteen Yorkshire hogs with initial weights of 25.5 pounds average were divided into two lots of eight hogs each and confined on concrete for a 56 day feeding program. One lot was kept as control and the other lot was fed the resin adsorbate of neomycin at a level equivalent to 100 grams per ton of Neomycin Base. During the 56 day period, the 100 gram of neomycin per ton feeding level produced an increase in weight of 6.4% over the controls and an improvement in feed conversion of 9.4% over the controls.

EXAMPLE 5

*Neomycin resin-adsorbate as chick "broiler" growth stimulant*

| Treatment | Av. Gain 8 weeks lb. | Feed Conversion Factor [1] |
|---|---|---|
| 1. Basal | 3.31 | 2.29 |
| 2. +5 grams Neomycin Base/T | 3.45 | 2.17 |
| 3. +20 grams Neomycin Base/T | 3.45 | 2.19 |
| 4. +40 grams Neomycin Base/T | 3.47 | 2.20 |
| 5. +80 grams Neomycin Base/T | 3.49 | 2.19 |

[1] Each treatment value is an average of 4 replicates of 8 birds each over a period of 8 weeks' growth.

EXAMPLE 6

Two lots of turkey poults containing 40 birds per lot were fed the neomycin resin-adsorbate of this invention dispersed in a normal basal diet at a level of 20 grams of neomycin activity per ton of feed. The controls consisted of two similar lots fed on the basal diet alone. After eight weeks, the birds on the basal diet showed an average weight gain of 4.71 pounds as compared to the birds on the augmented diet of this invention which showed an average weight gain of 5.14 pounds. Statistical analysis of the data indicates that the 0.4 pound difference in the weight gains was significant.

I claim:

1. The process of promoting the growth of healthy animals which comprises the oral administration to said animals of carboxylic acid resin complexes of neomycin admixed with the normal edible ration of said animals, said carboxylic acid resin adsorbate of neomycin being present in a concentration range of 5 grams to 500 grams of neomycin base-activity per ton of feed.

2. The process in accordance with claim 1 for promoting the growth of animals, wherein the feed administered is a fortified poultry feed.

3. The process in accordance with claim 1 for promoting the growth of animals, wherein the feed administered is the normal weaning feed for young mammals.

4. The process in accordance with claim 1 for promoting the growth of animals, wherein the feed administered is the normal nutrient diet for domestic animals.

References Cited by the Examiner

UNITED STATES PATENTS

| 2,929,711 | 3/1960 | Stokstad et al. | 99—2 |
| 2,960,437 | 11/1960 | Friedman et al. | 167—6 |
| 3,085,936 | 4/1963 | Caldas et al. | 99—2 |

A. LOUIS MONACELL *Primary Examiner.*

D. J. DONOVAN, *Assistant Examiner.*

UNITED STATES PATENT OFFICE
CERTIFICATE OF CORRECTION

Patent No. 3,250,623                                              May 10, 1966

Giles St. Clair

It is hereby certified that error appears in the above numbered patent requiring correction and that the said Letters Patent should read as corrected below.

Column 1, line 11, for "3,085,036 April 14, 1963" read -- 3,085,936 April 16, 1963 --.

Signed and sealed this 22nd day of August 1967.

(SEAL)
Attest:

ERNEST W. SWIDER                                        EDWARD J. BRENNER
Attesting Officer                                                Commissioner of Patents